United States Patent
Mehta et al.

(10) Patent No.: US 7,907,561 B2
(45) Date of Patent: Mar. 15, 2011

(54) SYSTEM AND METHOD FOR INTEGRATING DEVICES INTO A WIRELESS NETWORK

(75) Inventors: Pratik M. Mehta, Austin, TX (US); Fahd Pirzada, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1417 days.

(21) Appl. No.: 11/364,254

(22) Filed: Feb. 28, 2006

(65) Prior Publication Data

US 2007/0202805 A1 Aug. 30, 2007

(51) Int. Cl.
*H04W 4/00* (2009.01)

(52) U.S. Cl. ......... 370/328; 370/338; 370/329; 370/341; 370/331; 455/435.2; 455/450; 455/451; 455/452.1

(58) Field of Classification Search ............... 455/435.2, 455/436–439, 450, 451, 452.1, 444, 445; 370/328, 329, 331, 338, 341, 464

See application file for complete search history.

(56) References Cited

U.S. PATENT DOCUMENTS

| | | | |
|---|---|---|---|
| 6,452,910 B1 | 9/2002 | Vij et al. | 370/310 |
| 6,587,479 B1 | 7/2003 | Bianchi et al. | 370/487 |
| 6,657,981 B1 | 12/2003 | Lee et al. | 370/331 |
| 2004/0160986 A1* | 8/2004 | Perlman | 370/480 |
| 2006/0114853 A1* | 6/2006 | Hasty et al. | 370/329 |
| 2008/0159244 A1* | 7/2008 | Hunziker | 370/338 |

* cited by examiner

*Primary Examiner* — Wayne Cai
(74) *Attorney, Agent, or Firm* — Hamilton & Terrile, LLP; Robert W. Holland

(57) ABSTRACT

A split architecture wireless access point (SAAP) extends a traditional wireless access point (TRAP) network by selectively interfacing or isolating a SAAP network with a deployed TRAP of the TRAP wireless network. The SAAP has a split architecture that interfaces with the TRAP as a client of the TRAP network and supports the SAAP network as a router. For instance, a client module communicates as a client of the TRAP wireless network over a TRAP channel and a router module routes information between clients of the SAAP network over a SAAP channel, the SAAP wireless network to advantageously benefit streaming of audiovisual information and other usages of the TRAP and SAAP wireless networks. A control module selectively allows communication between the router and client modules to support communication between information handling systems associated with the SAAP wireless network and the TRAP wireless network.

13 Claims, 2 Drawing Sheets

SYSTEM AND METHOD FOR INTEGRATING DEVICES INTO A WIRELESS NETWORK

BACKGROUND OF THE INVENTION

1. Field of the Invention

The present invention relates in general to the field of information handling system networks, and more particularly to a system and method for integrating devices into a wireless network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One valuable use of information handling systems is in networks that support end user communication with each other and with distributed storage locations. Initially, information handling systems were networked through cables, such as Cat 5 Ethernet cables, that typically terminated at a common switch or server. Over the past several years, wireless networking standards have developed that communicate information between information handling systems without cables, such as through networks based on 802.11 in the 2.4 GHz or 5 GHz bands. Wireless networking has become quite popular among end users largely due to the convenience it provides. For instance, end users with a portable information handling system are freed from the stationary computing use cases associated with wired networks while still able to receive communications through a wireless network. Indeed, many end users have brought wireless networks into their home space for greater convenience and to allow greater freedom in placement of home office equipment, such as printers or other peripherals that interface through a wireless network. A typical home network has a wireless access point (WAP or AP) that communicates with a protocol compliant with the 802.11a, b or g standards. The 802.11b and g standards communicate in the 2.4 GHz band while the 802.11a standard communicates with the 5 GHz band. In future, 802.11n is expected to utilize the same frequency bands. The 5 GHz band has a greater number of channels and generally provides a greater bandwidth that is free of interference found in the 2.4 GHz band, such as from cordless phones and microwave ovens. Also, the 2.4 GHz band has fewer usable channels.

As with information handling systems, wireless networking devices have steadily improved over time. For instance, in the time since the 802.11b standard was first released, security mechanisms for wireless networks have improved and quality of service (QoS) mechanisms have been embodied, such as in the 802.11e standard. QoS mechanisms separate the priority of multiple usages of a single network, typically represented by an AP and its clients, so that priority usages have predictable bandwidth to provide a service, such as for telephone or audiovisual streaming. Although typical home networks have only a single AP, the 802.11 standards do allow APs to interact in several modes. For instance, in a point-to-point bridge mode, an AP communicates with only another bridge-mode wireless device. In a point-to-multipoint bridge mode, an AP acts as a master of a group of bridge-mode wireless devices. In a repeater mode, an AP sends all traffic to another remote AP or device. An AP in a bridged mode is physically configured to connect to another AP either using a cable or through a wireless channel. Bridging implies that all traffic on any bridged AP is seen on the networks associated with each bridged AP, thereby taxing the bandwidth of each AP. As an alternative, APs may be physically connected to each other to route information between LAN ports using an Ethernet cable. In a routed mode, only traffic intended for an AP goes to the LAN port for the AP so that bandwidth is preserved. Generally, interacting multiple APs with each other is too complex of an operation for a home end user. Updating an existing wireless network for new features may not be possible due to limitations of the existing equipment. Often, home end users set up a wireless network with a single AP and leave it alone until a problem arises, however, this approach limits the installation of updated networking capabilities.

SUMMARY OF THE INVENTION

Therefore a need has arisen for a system and method which simplifies the integration of wireless networking access points with a traditional wireless network.

In accordance with the present invention, a system and method are provided which substantially reduce the disadvantages and problems associated with previous methods and systems for integrating wireless networking access points with an existing wireless network. A split architecture wireless access point (SAAP) has a split architecture to deploy in an existing wireless network as a client of the traditional wireless network access point (TRAP) and as an Access Point for its own clients. Information handling systems communicate across a wireless channel of the SAAP network that is isolated from the TRAP network and selectively interface with the TRAP network through the client relationship of the SAAP.

More specifically, a TRAP wireless network has one or more clients that communicate over one or more wireless channels in a wireless networking band. A SAAP interfaces with the TRAP wireless network through a TRAP wireless channel with a client module that presents the SAAP as a client on the TRAP wireless network. A router module of the SAAP supports a SAAP network on another wireless channel, in the same or separate wireless bands. TRAP and/or SAAP may support a single or both bands (2.4 and 5 GHz). The SAAP wireless network is selectively isolated from the TRAP wireless network with a control module. The SAAP wireless network is selectively isolated from the TRAP wireless network with a control module that interfaces the client module and the router module regardless of the band used by the TRAP and/or the SAAP. Isolation of communication over the SAAP network with the router module allows dedication of wireless channel bandwidth to desired applications, such as, but not limited to, streaming of audiovisual information from a television tuner or a server information handling system that stores audiovisual files. Interfacing of the SAAP as a client of the TRAP wireless network allows selective interaction of information handling systems supported by the router module with the TRAP wireless network, such as to use an existing Internet connection or deployed peripherals of the TRAP wireless network.

The present invention provides a number of important technical advantages. One example of an important technical advantage is that a wireless access point is seamlessly and wirelessly integrated with an existing wireless network. A TRAP wireless network is wirelessly extended through addition of a wireless access point having a split architecture that allows the SAAP to interact as a client of the TRAP wireless network and as an Access Point for clients of a new network. The clients of the new network have access to the TRAP network, such as an existing Internet connection of the TRAP wireless network, through the client architecture of the SAAP. However, the clients of the new SAAP network also have a separate network environment through the router architecture of the SAAP. The separate added network centered about the router architecture of the SAAP may take advantage of upgraded networking capabilities without changes made to the TRAP network. For instance, audiovisual streaming from a television tuner feed or server received by the SAAP is available to clients of the SAAP without interference with the TRAP wireless network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A wireless access point with a split architecture (SAAP) expands a TRAP wireless network by integrating as a client of the TRAP wireless network while supporting a selectively isolated SAAP network as a router that wirelessly communicates between information handling systems of the SAAP network. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
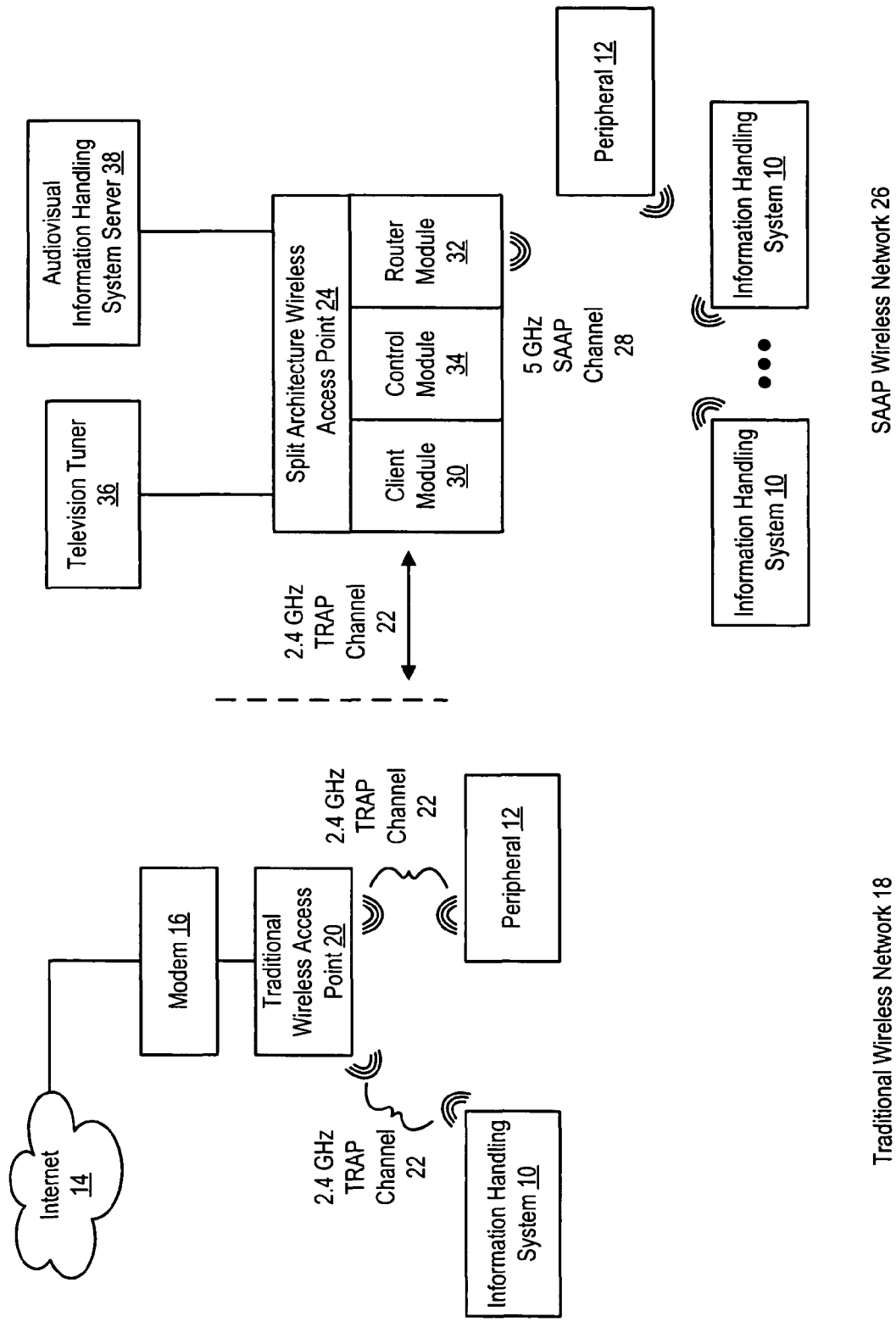
FIG. 1 depicts a block diagram of TRAP and SAAP networks interfaced with a split architecture of the SAAP having a client relationship to the TRAP wireless access point.

Referring now to FIG. 1, a block diagram depicts TRAP and SAAP wireless networks interfaced with a split architecture of a SAAP having a client relationship to a TRAP. Information handling systems 10 and peripherals 12 communicate with each other and the Internet 14 through a modem 16 by using a TRAP wireless network 18 supported by a traditional wireless access point (TRAP) 20. For instance, TRAP 20 has a transceiver that supports one or more wireless TRAP channels 22 in a single band or dual band configuration. Information handling systems 10 and peripherals 12 share one or more wireless channels 22 in a wireless local area network managed by TRAP 20.

In order to extend the capability of TRAP wireless network 18 with minimal or no impact on its operation, a split architecture wireless access point (SAAP) 24 interfaces as a client of TRAP wireless network 18 through a TRAP channel 22. SAAP 24 supports communication between one or more information handling systems 10 or peripherals 12 in a SAAP network 26 that uses a SAAP wireless channel 28. SAAP 24 selectively isolates SAAP network 26 from TRAP wireless network 18 with a split architecture that enables it to act both as a client of TRAP wireless network 18 through a wireless TRAP channel 22 and a router through a wireless channel 28. A client module 30 establishes and maintains the client relationship with TRAP wireless network 18 so that SAAP 24 automatically integrates with TRAP 20 through wireless channel 22. A router module 32 establishes and maintains SAAP network 26 so that information is routed between information handling systems 10 and peripherals 12 through wireless channel 28. A control module 34 interfaces client module 30 and router module 32 to allow selective interaction of information handling systems 10 associated with SAAP wireless network 26 and TRAP wireless network 18.

In the embodiment depicted by FIG. 1, SAAP 24 has dual transceivers to support communication in separate wireless bands, such as the 2.4 and 5 GHz bands. In another embodiment, SAAP may have dual transceivers to support communication in the same wireless band. Single or dual-band operation does not impair the functionality claimed by this invention. Where SAAP 24 supports dual bands, the selective isolation of SAAP network 26 is enabled without hardware changes by relying on the separate bands to support the split architecture. In alternative embodiments, SAAP 24 may operate with a single wireless band that matches the band used by TRAP 20 by dedicating one or more channels to each of TRAP wireless network 18 and SAAP network 26. The use of dual band transceivers allows dedication of a wireless band to SAAP network 26 so that high bandwidth applications have adequate bandwidth. For instance, SAAP 24 extends an 802.11(b) or (g) traditional wireless network 18 to support high bandwidth audiovisual applications through an 802.11(a) SAAP network 26. Audiovisual information from a television tuner 36 is routed through router module 32 so that information handling systems 10 interfaced through wireless channel 28 can retrieve and present television signals. Similarly, audiovisual information from an audiovisual information handling system server 38, such as movies from DVDs, is routed through router module 32 for presentation at information handling systems 10 through wireless channel 28. If an information handling system 10 of SAAP network 26 wants to interact with the deployed Internet modem 16 of TRAP network 18, then control module 34 leverages the client relationship of SAAP 24 to support the communication of Internet information.

Figure 2:
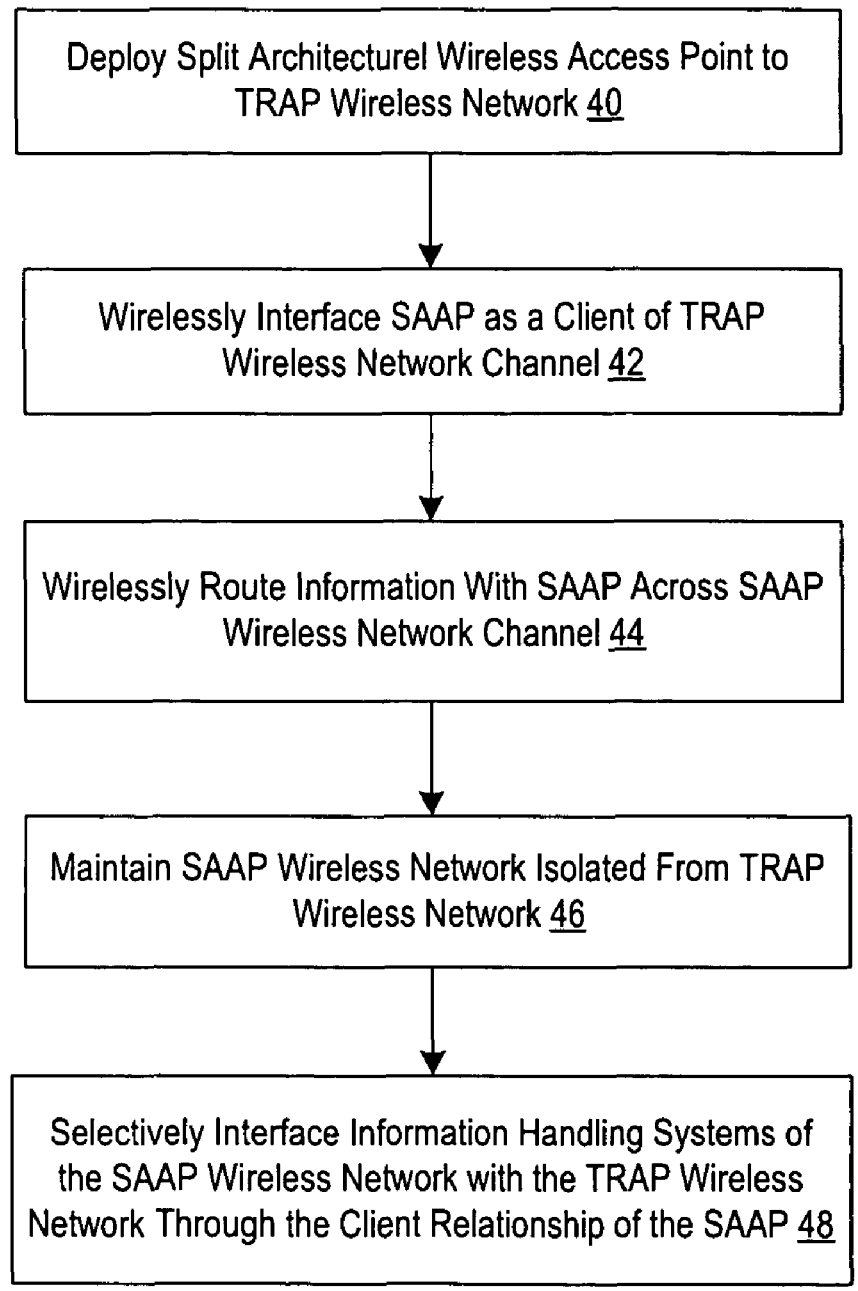
FIG. 2 depicts a flow diagram of a process for deploying a SAAP wireless network to a TRAP wireless network with a split architecture.

Referring now to FIG. 2, a flow diagram depicts a process for deploying a SAAP network to a TRAP wireless network. The process begins at step 40 by deploying the SAAP within range of wireless communication with the TRAP wireless network. At step 42, the SAAP interfaces as a client with the TRAP wireless access point through a TRAP wireless network channel, such as one or more 802.11(a, b or g) channels. At step 44, information is wirelessly routed with the SAAP across a SAAP wireless network channel, such as one or more 802.11(a, b or g) channels. For example, the SAAP wireless network channel provides bandwidth dedicated to communication of audiovisual information. At step 46, the SAAP network is maintained isolated from the TRAP wireless network to minimize the impact on the TRAP wireless network. Maintaining the isolation of the SAAP network allows advanced features on that network that may not be supported by the TRAP wireless network, such as high throughput and quality of service features. At step 48, information handling systems of the SAAP network selectively interface with the TRAP wireless network through the wireless client relationship of the SAAP. Leveraging the wireless client relationship of the SAAP allows information handling systems associated with the SAAP network to access TRAP network features with minimal or no impact on the TRAP wireless network.

Although the present invention has been described in detail, it should be understood that various changes, substitutions and alterations can be made hereto without departing from the spirit and scope of the invention as defined by the appended claims.

What is claimed is:

1. A system for networking information handling systems, the system comprising:
   a traditional wireless access point (TRAP) supporting communication of information for one or more information handling systems over one or more TRAP wireless channels;
   a split architecture wireless access point (SAAP) supporting communication of information for one or more information handling systems over one or more SAAP wireless channels, the split architecture wireless access point having a router module configured to route information between information handling systems through the SAAP wireless channel and having a client module configured to interact as a client of the traditional wireless access point through the TRAP wireless channel; and
   wherein the client module is further configured to support communication between an information handling system associated with the SAAP wireless channel and the traditional wireless access point.

2. The system of claim 1 wherein the TRAP wireless channel comprises a channel of a first predetermined band and the SAAP wireless channel comprises a channel of a second predetermined band different from the first band.

3. The system of claim 2 further comprising an audiovisual server information handling system interfaced with the SAAP wireless channel and configured to stream audiovisual information through the SAAP wireless channel.

4. The system of claim 3 wherein the audiovisual server information handling system comprises a television tuner configured to stream television content.

5. The system of claim 3 wherein the audiovisual server information handling system comprises a storage device storing audiovisual content.

6. The system of claim 1 further comprising an Internet modem interfaced with the TRAP wireless channel, the client module configured to support communication of an information handling system associated with the SAAP wireless channel and the Internet modem.

7. A method for deploying a split architecture wireless access point (SAAP) to interface with a traditional wireless network having a traditional wireless access point (TRAP), the method comprising:
   deploying the SAAP in the traditional wireless network;
   interfacing the SAAP as a client of the traditional wireless access point through an TRAP wireless channel supported by the traditional wireless access point;
   interfacing plural SAAP network information handling systems as clients of the SAAP through a SAAP wireless channel supported by the split architecture wireless access point;
   routing information through the SAAP wireless channel with the SAAP to support communication between the split architecture client information handling systems that is isolated from the traditional wireless access point; and
   using the split architecture wireless access point as a client of the traditional wireless access point to support communication between split architecture client information handling systems and the TRAP network through the TRAP wireless channel.

8. The method of claim 7 wherein:
   interfacing the split architecture wireless access point as a client of the traditional wireless access point through an traditional wireless access channel further comprises interfacing the split architecture access point with the traditional wireless access point through a first band; and
   routing information through the SAAP wireless channel further comprises routing information through the first band or through a second band.

9. The method of claim 7 wherein the SAAP wireless network is deployed in the TRAP wireless network requiring no changes to the TRAP network settings.

10. The method of claim 7 wherein the split architecture client information handling systems comprise a television tuner having streaming audiovisual information.

11. The method of claim 7 wherein the split architecture client information handling systems comprise an audiovisual server storing audiovisual information.

12. The method of claim 7 wherein the split architecture client information handling systems comprise an IP television.

13. The method of claim 7 wherein using the split architecture wireless access point as a client of the traditional wireless access point to support communication further comprises:
   maintaining an Internet connection associated with the traditional wireless access point; and
   obtaining Internet information at a split architecture information handling system by using the split architecture wireless access point as a client of the traditional wireless access point.

* * * * *